Figure 1:
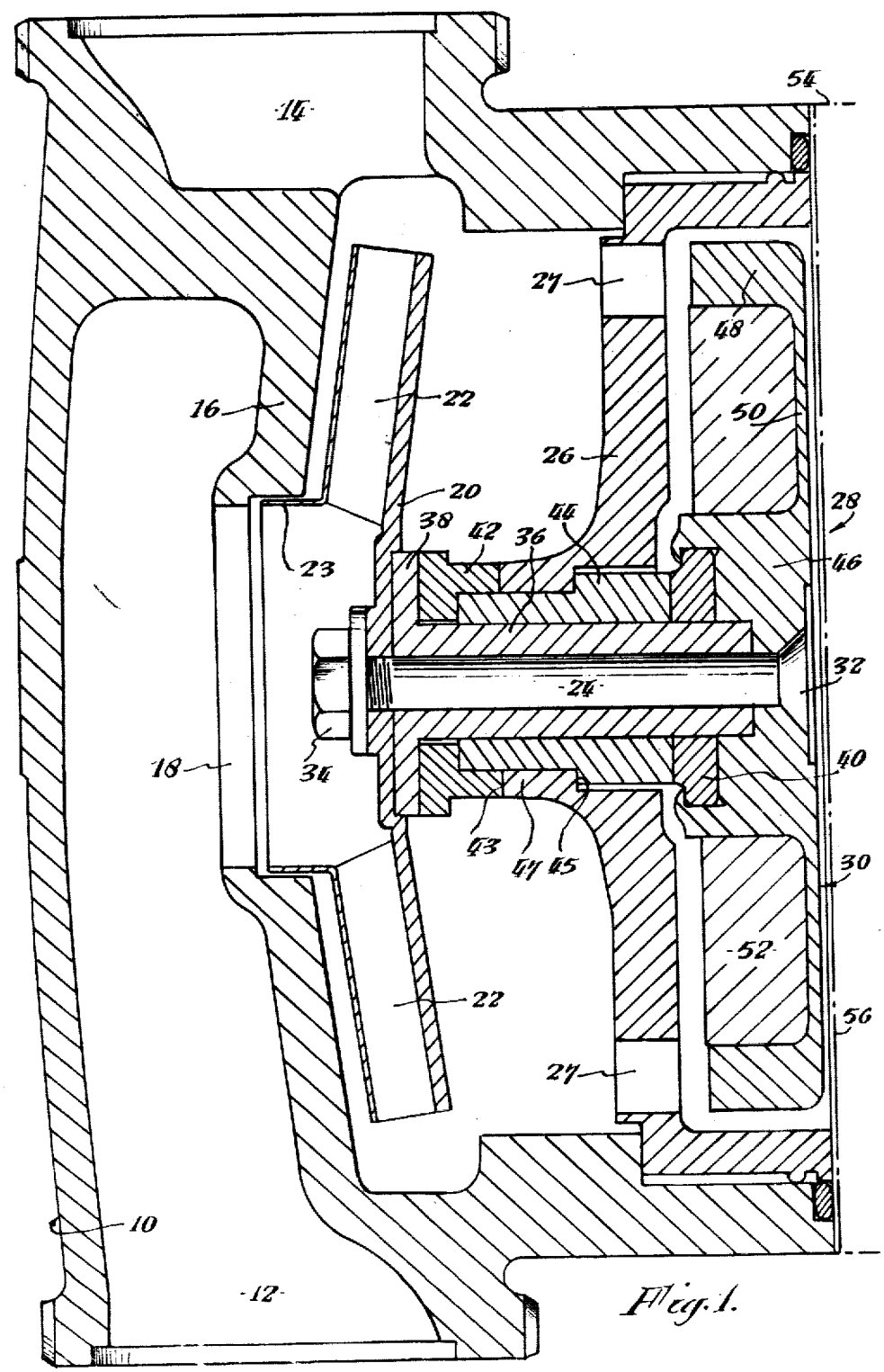

United States Patent [19]
Clark

[11] 4,311,937
[45] Jan. 19, 1982

[54] AXIAL GAP ELECTRIC MOTORS

[75] Inventor: Ronald J. Clark, Sidmouth, England

[73] Assignee: Sealed Motor Construction Co. Ltd., Bridgwater, England

[21] Appl. No.: 854,644

[22] Filed: Nov. 25, 1977

Related U.S. Application Data

[63] Continuation of Ser. No. 598,423, Jul. 23, 1975, abandoned.

[30] Foreign Application Priority Data

Jul. 25, 1974 [GB] United Kingdom ............ 32972/74

[51] Int. Cl.³ .................................................... H02K 1/22
[52] U.S. Cl. .................................... 310/268; 310/62; 310/90; 417/420
[58] Field of Search ............ 310/90, 62, 63, 211, 310/268, 103, 104, 105, 106, 108, 43, 156, 86; 308/121, 122, 123, 237, 238, 240; 417/420

[56] References Cited

U.S. PATENT DOCUMENTS

| | | | |
|---|---|---|---|
| 3,476,054 | 11/1969 | Gangloff | 310/268 |
| 3,767,330 | 10/1973 | Signorile | 310/268 |
| 3,870,907 | 10/1973 | Hoffman | 310/90 |

FOREIGN PATENT DOCUMENTS

| | | | |
|---|---|---|---|
| 800246 | 5/1973 | Belgium | 310/268 |
| 1502641 | 10/1967 | France | 310/268 |
| 946721 | 1/1964 | United Kingdom | 310/268 |

Primary Examiner—R. Skudy
Attorney, Agent, or Firm—Larson and Taylor

[57] ABSTRACT

An axial gap induction motor has a rotor with conductive and ferromagnetic components. The conductive component comprises a thin interstator web and axially thickened hub and rim portions, the ferromagnetic component being located in the annular channel formed thereby. A ceramic bearing pack for the rotor shaft has two parts, one rotating with the shaft and the other mounted to a fixed support. The two bearing parts provide cylindrical bearing surfaces and opposite end thrust bearing surfaces.

A preferred application of the motor is in a liquid pump where the rotor rotates in the liquid and is carried at one end of the shaft, a centrifugal impeller, having a closed face and a sleeved eye, being carried at the other end of the shaft.

11 Claims, 3 Drawing Figures 4,311,937

AXIAL GAP ELECTRIC MOTORS

This is a continuation of application Ser. No. 598,423 filed July 23, 1975, now abandoned.

FIELD OF THE INVENTION

This invention relates to axial gap electric motors, and is especially applicable to liquid pumps incorporating such motors.

BACKGROUND TO THE INVENTION

An axial gap electric motor may have a rotor which is of squirrel cage or of eddy current design. The squirrel cage design is inherently more efficient since the iron to iron axial gap is smaller than in the eddy current motor. However, squirrel cage motors are generally noisier and have a strong axial attraction between the rotor and stator because of the iron in the rotor. Although in a centrifugal pump this attraction can be more or less balanced at normal speeds by the axial thrust of the impeller carried by the rotor shaft, this does not apply if the motor should run slowly or if it should run dry. Also, in the latter event, the heating of the bearing surfaces in normally employed plain bearings soon causes the motor to break down. Another problem in water pumps driven by squirrel cage motors is corrosion of the iron, and the production of rust and other particles limits the extent to which the axial gap can be reduced.

SUMMARY OF THE INVENTION

The present invention provides an axial gap induction motor comprising a housing, a flat face stator in the housing, a rotor carried on a shaft which is journalled to a support in the housing so that the rotor face is separated by a small axial gap from the stator face, the rotor comprising a highly conductive component and a ferromagnetic component, the conductive component taking the form of a thin annular web in a plane facing the stator and joining axially thicker hub and rim portions so as to define an annular channel around the conductive component which is occupied by the ferromagnetic component, the rotor shaft being journalled to its support through a ceramic bearing pack, the pack being formed from a first part which rotates with the shaft and a second part which is secured to the support, the first part providing mutually facing end thrust bearing surfaces and an intermediate external cylindrical bearing surface, and the second part providing mutually outwardly facing end thrust bearing surfaces which mate with those of the first part and an intermediate internal cylindrical bearing surface which mates with the external cylindrical bearing surface of the first part.

Preferably, the first bearing part comprises two elements, one element taking the form of a sleeve to receive the rotor shaft and provide external cylindrical surface and an integral outwardly directed flange at one end thereof to provide one of the end thrust bearing surfaces, the other element taking the form of a flat annulus to provide the opposite end thrust bearing surface, the second bearing part also comprising two elements, one element taking the form of a sleeve to receive and mate with the sleeve of the first bearing part and provide at one end thereof one of the outwardly facing end thrust bearing surfaces, the other element being of annular form to receive the sleeve of the first bearing part and provide the other outwardly facing end thrust bearing surface, the two elements of the second bearing part being formed with mutually inwardly facing shoulders to receive an annular portion of the rotor shaft support and thereby locate the bearing pack axially. Preferably the rotor shaft is provided with screw means by which said one element on the first bearing part is clamped to the rotor and can be released therefrom to dismantle the bearing pack. A number of bearings may be provided at different locations along the rotor shaft if desired.

In a preferred form, the annular web of the conductive component of the rotor lies on the surface of the rotor nearest the stator. A second stator may be provided on the opposite side of the rotor. In this case a second annular conductive web is preferably provided on that side of the rotor and adjoining the hub and rim portions, so that the magnetic component of the rotor is enclosed by the conductive component.

A preferred application of the motor is in a liquid pump in which the rotor rotates in the liquid and the stator is sealed therefrom, a centrifugal impeller being secured to the rotor shaft at the opposite end of the bearing with the eye of the impeller opening in the axial direction away from the rotor, the housing having a liquid inlet leading to the impeller eye through an opening in an internal wall of the housing and a liquid outlet from a region of the housing at the periphery of the impeller. The impeller is preferably of the closed face type with an axially projecting sleeve around the eye extending at least partially through said opening in the internal wall of the housing with small peripheral clearance. Advantageously, the impeller is dished so as to be somewhat convex around the impeller eye.

BRIEF DESCRIPTION OF THE DRAWINGS AND DESCRIPTION OF THE PREFERRED EMBODIMENT

Figure 2:
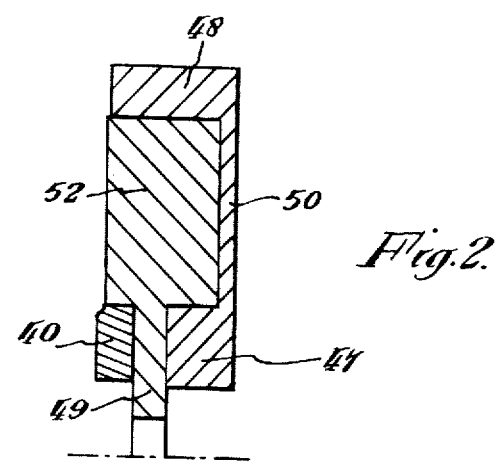
Figure 3:
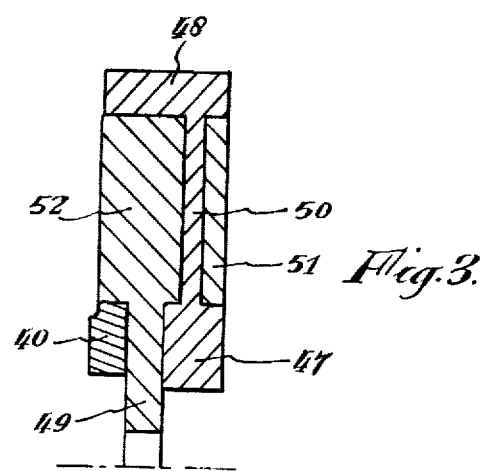

In order that the invention may be more clearly understood, one embodiment, and modifications thereof, will now be described with reference to the accompanying drawings, in which FIG. 1 shows a cross-sectional side view through the pump casing, and FIGS. 2 and 3 show detail cross-sectional views through part of modified rotor designs.

Referring to FIG. 1; the pump comprises a casing 10 having an inlet 12 and an outlet 14 for water being pumped. Internally, the inlet and outlet regions are separated by a partition 16 having a circular opening 18. On the upstream side of the partition there is located a centrifugal impeller 20 having radial vanes 22 extending from a sleeved central axial eye 23 which is located in the opening 18 to receive water from the inlet side of the casing. The impeller is securely mounted on one end of a spindle 24 which extends through the centre of a circular bracket 26 which is a push fit into an open side 28 of the pump casing 10. The other end of the spindle 24 has secured to it a rotor disc 30 of a drive motor for the pump. The spindle 24 is in the form of a bolt having a head 32 at one end, and screw threaded at the other end to receive a retaining nut 34. A tubular ceramic bearing element 36 is clamped between the rotor disc and impeller, and at the impeller end it is formed with a radial flange 38 to provide an axial bearing surface. A ceramic thrust washer 40 surrounds the bearing element 36 at the other end and is secured to the rotor disc. There is thus formed a composite bearing surface, rotatable with the rotor and impeller, comprising a cylindrical axially extending surface and two mutually facing thrust bearing surfaces. This composite bearing surface rotates within a stationary bearing surface formed by two ceramic elements 42, 44 which are fitted to the bracket 26, and provide an axially extending cylindrical bearing surface and two mutually outwardly facing thrust bearing surfaces. It will be seen that the elements 42, 44 are fitted together and have shoulders 43, 45 which between them receive an annular portion 47 of the bracket 26. This positively locates the bearing pack axially. Thus, the impeller-rotor combination is journalled to the bracket 26 with bearing surfaces adapted to cater for axial thrust in either direction.

The rotor is of composite construction, comprising a highly conductive component, for example of copper or aluminium, and a ferromagnetic component, for example of cast or sintered iron. The conductive component comprises a hub portion 46 and a rim portion 48, connected by a thin web 50. The hub and rim are substantially thickened in the axial direction towards the impeller, and also have an appreciable radial dimension. The thus defined annular recess in the back of the conductive component is filled with the magnetic component 52.

The stator can be of conventional construction for an axial air gap motor, being housed in a separate casing 54 which is detachably mounted to the open side 28 of the pump casing. The stator is sealed from the water in the pump by a thin diaphragm 56 which extends over the opening 28. The stator lies directly opposite, and is radially co-extensive with, the magnetic component 52 of the rotor, so that the magnetic component acts as a core to receive and provide a return path for the magnetic flux passing axially across the air gap to the thin conducting web 50 of the rotor. The amount of magnetic material in the rotor is such as to act as a receiver and return path for substantially the whole of the magnetic flux passing through the web 50. Of course, a certain amount of extraneous magnetic flux is bound to exist outside this core, but the efficiency of the core in this respect is such that, for example, if the bracket 26 were made from magnetic material it would make substantially no contribution to the flux path, and hence to the performance of the motor. Thus, the bracket can be made of any convenient material, for example moulded plastics material.

The thickness of the web 50 is necessarily a compromise between the need to keep the iron to iron gap of the magnetic flux path as small as possible, while at the same time keeping the conductivity of the magnetic component of the rotor as high as possible. The conductivity of the rotor is enhanced by providing substantial amounts of conductive material in the hub and peripheral regions 46, 48. Since these lie radially inside and outside respectively of the stator core, they make no appreciable contribution to the torque of the motor, but act as short circuit elements for the radial induced currents in the conductive web.

The bracket 26 is provided with apertures 27 to allow the free flow of water around the rotor. The bracket is held in place by the stator casing 54, so that on removing the stator casing the bracket, together with its attached impeller and rotor, can be simply withdrawn. This makes for particularly easy access for servicing and repair.

FIG. 2 shows a modification of the rotor construction, in which the hub of the rotor is formed from the magnetic rather than the conductive component. The conductive component has an inner short circuit ring 47, which extends axially with respect to the web 50. The ferromagnetic component 52 has an integrally formed radially inwardly directed annular flange 49, by means of which the rotor is secured to the rotor shaft. The thrust bearing washer 40 is secured in the angle between the flange 49 and the magnetic core 52.

FIG. 3 shows a modification of the form shown in FIG. 2, in which the conductive web 50 is slightly inset from the face of the rotor, and the resulting recess is filled with an annular ferromagnetic plate 51 of for example up to 1 mm. in thickness. This arrangememnt produces different axial thrust characteristics resulting from the attraction between the rotor and stator, and it may be useful for axial thrust compensation in certain applications of the motor.

The present invention provides a novel and useful combination of features in axial gap motors. The motor runs silently in the absence of conducting bars in the rotor. The configuration of the magnetic component in the rotor provides maximum electrical efficiency, while the ferromagnetic component secured against the back face of the relatively thin interstator conductive web eliminates the second air gap which is characteristic of the conventional eddy current motors. The use of a ceramic bearing pack, including cylindrical bearing surfaces as well as end thrust bearing surfaces, means that the rotor can be very accurately located axially, so that the air gap between the rotor and stator can be reduced to a minimum, and also the bearings can run in the dry state, which is not generally possible with conventional plain bearings. The preferred construction of bearing pack enables the running tolerances to be closely manufactured in the ceramic pack, and the pack can be easily dismantled and reliably reassembled if desired. The incorporation of the magnetic material in the back of the rotor enables just the right amount of magnetic material to be used, so that there is no unnecessary axial force towards the stator. In the context of a water circulating pump, the motor has a surprisingly high efficiency, and can drive a relatively large impeller. A sleeved impeller eye rotating closely within the opening in the internal wall of the pump minimises leakage of water past the impeller, and provides a more accurately determined axial thrust from the impeller, so that this can be combined with the opposite axial thrust resulting from the attraction between the rotor and stator to provide a better balanced system under normal running conditions. A dished configuration of the impeller is of improved efficiency and can add to the compensating hydraulic axial thrust. If the motor should run too slowly, or if it should run dry, the bearing pack is able to withstand the extreme conditions placed upon it.

I claim:

1. In an improved liquid pump of the type which is driven by an axial gap electric induction motor wherein the rotor rotates in the liquid within the pump housing and the stator is sealed from the liquid, the rotor being carried at one end of a shaft rotatably mounted to a support in the housing and a centrifugal impeller being carried at the other end of the shaft with the eye of the impeller opening in the axial direction away from the rotor, the housing having a liquid inlet leading to the impeller eye through an opening in an internal wall of the housing and a liquid outlet from a region of the housing at the periphery of the impeller, the rotor having a highly conductive component in the form of a thin annular web disposed in a plane facing the stator and separated therefrom by a small axial gap and joining axially thicker hub and rim portions so as to define an annular channel around the conductive component, an unenergized ferromagnetic core being disposed opposite the stator to provide a return path for the magnetic flux from the stator; the improvement wherein the whole of the effective unenergized ferromagnetic component is secured to the rotor and occupies said annular channel, and the rotor shaft is journalled to the said support therefor through a ceramic bearing pack, the pack being formed from a first part which is fabricated of a ceramic material and rotates with the shaft and a second part which is fabricated on a ceramic material and is secured to the support, the first part including means providing mutually facing end thrust bearing surfaces and an intermediate external cylindrical bearing surface, and the second part including means providing mutually outwardly facing end thrust bearing surfaces which mate with those of the first part and an intermediate internal cylindrical bearing surface which mates with the external cylindrical bearing surface of the first part.

2. The improved liquid pump of claim 1, in which the first bearing part comprises two elements, one element taking the form of a sleeve to receive the rotor shaft and provide the external cylindrical surface and an integral outwardly directed flange at one end thereof to provide one of the end thrust bearing surfaces, the other element taking the form of a flat annulus to provide the opposite end thrust bearing surface, the second bearing part also comprising two elements, one element taking the form of a sleeve to receive and mate with the sleeve of the first bearing part and provide at one end thereof one of the outwardly facing end thrust bearing surfaces, the other element being of annular form to receive the sleeve of the first bearing part and provide the other outwardly facing end thrust bearing surface.

3. The improved liquid pump of claim 2 in which the two elements of the second bearing part are formed with mutually inwardly facing shoulders to receive an annular portion of the rotor shaft support and thereby locate the bearing pack axially.

4. The improved liquid pump of claim 2 in which the rotor shaft is provided with screw means at its end remote from the rotor by which the impeller is secured to the shaft and said one element of the first bearing part is clamped between the impeller and rotor and can be released therefrom to dismantle the bearing pack.

5. The improved liquid pump of claim 1 wherein the impeller is of the closed face type with an axially projecting sleeve around the eye extending at least partially through said opening in the internal wall of the housing with small peripheral clearance.

6. The improved liquid pump of claim 1 wherein the impeller is dished so as to be somewhat convex around the impeller eye.

7. In an improved axial gap induction motor of the type which comprises a housing, a flat face energized stator in the housing, a rotor carried on a shaft which is journalled to a support in the housing so that the rotor face is separated by a small axial gap from the stator face, and an unenergized ferromagnetic component disposed opposite the energized stator so as to provide the return path for the magnetic flux from the stator, the rotor comprising a highly conductive component in the form of a thin annular web disposed in a plane facing the stator and joining axially thicker hub and rim portions so as to define an annular channel around the conductive component, the improvement wherein the whole of the effective unenergized ferromagnetic component is secured to the rotor and occupies said annular channel, and the rotor shaft is journalled to the said support therefor through a ceramic bearing pack, said ceramic bearing pack being formed from a first part which is fabricated of a ceramic material and rotates with the shaft and a second part which is fabricated of a ceramic material and is secured to the support, the first part including means providing mutually facing end thrust bearing surfaces and an intermediate external cylindrical bearing surface, and the second part including means providing mutually outwardly facing end thrust bearing surfaces which mate with those of the first part and an intermediate internal cylindrical bearing surface which mates with the external cylindrical bearing surface of the first part.

8. A motor according to claim 7 wherein the rotor shaft is provided with screw means, disposed at its end remote from the rotor, for releasably clamping an element of the first bearing part which provides said intermediate external cylindrical bearing surface to the rotor.

9. An axial gap induction motor comprising a housing, a flat face stator in the housing, a rotor carried on a shaft which is journalled to a support in the housing so that the rotor face is separated by a small axial gap from the stator face, the rotor comprising a highly conductive component and a ferromagnetic component, the conductive component taking the form of a thin annular web in a plane facing the stator and joining axially thicker hub and rim portions so as to define an annular channel around the conductive component which is occupied by the ferromagnetic component, the rotor shaft being journalled to its support through a ceramic bearing pack, the pack being formed from a first part which rotates with the shaft and a second part which is secured to the support, the first part providing mutually facing end thrust bearing surfaces and an intermediate external cylindrical bearing surface, and the second part providing mutually outwardly facing end thrust bearing surfaces which mate with those of the first part and an intermediate internal cylindrical bearing surface which mates with the external cylindrical bearing surface of the first part, the first bearing part comprising two elements, one element taking the form of a sleeve to receive the rotor shaft and provide the external cylindrical surface and an integral outwardly directed flange at one end thereof to provide one of the end thrust bearing surfaces, the other element taking the form of a flat annulus to provide the opposite end thrust bearing surface, the second bearing part also comprising two elements, one element taking the form of a sleeve to receive and mate with the sleeve of the first bearing part and provide at one end thereof one to the outwardly facing end thrust bearing surfaces, the other element being of annular form to receive the sleeve of the first bearing part and provide the other outwardly facing end thrust bearing surface.

10. A motor according to claim 9 wherein the two elements of the second bearing part are formed with mutually inwardly facing shoulders to receive an annular portion of the rotor shaft support and thereby locate the bearing pack axially.

11. In an axial gap induction motor comprising a housing, a flat face stator in the housing, a rotor rotatably mounted within the housing so that the rotor face is separated by a small axial gap from the stator face, the rotor comprising a highly conductive component and a ferromagnetic component, the improvement wherein the conductive component takes the form of a thin annular web in a plane facing the stator and joining axially thicker hub and rim portions so as to define an annular channel around the conductive component which is occupied by the ferromagnetic component and wherein the rotor is journalled to the housing through a ceramic bearing pack, the pack being formed from a first part which rotates with the rotor and a second part which is secured to the housing, one of said parts providing mutually facing end thrust bearing surfaces and an intermediate external cylindrical bearing surface, and the other of said parts providing mutually outwardly facing end thrust bearing surfaces which mate with those of said one part and an intermediate internal cylindrical bearing surface which mates with the external cylindrical bearing surface of said one part.

* * * * *